United States Patent
Sankey et al.

(10) Patent No.: US 12,401,044 B2
(45) Date of Patent: Aug. 26, 2025

(54) CURRENT COLLECTORS COMPRISING METALLISED FILMS

(71) Applicant: Mylar Specialty Films U.S. Limited Partnership, Chester, VA (US)

(72) Inventors: Stephen Sankey, Wilton (GB); Stephen Jones, Wilton (GB); Pedro Nunes, Luxembourg (LU); Lucien Schosseler, Luxembourg (LU)

(73) Assignee: Mylar Specialty Films U.S. Limited Partnership, Chester, VA (US)

( * ) Notice: Subject to any disclaimer, the term of this patent is extended or adjusted under 35 U.S.C. 154(b) by 0 days.

(21) Appl. No.: 18/559,550

(22) PCT Filed: May 13, 2022

(86) PCT No.: PCT/GB2022/051215
§ 371 (c)(1),
(2) Date: Nov. 7, 2023

(87) PCT Pub. No.: WO2022/238713
PCT Pub. Date: Nov. 17, 2022

(65) Prior Publication Data
US 2024/0266546 A1    Aug. 8, 2024

(30) Foreign Application Priority Data
May 13, 2021 (GB) .................................. 2106834

(51) Int. Cl.
*H01M 4/66* (2006.01)
*H01M 4/04* (2006.01)
*H01M 10/0525* (2010.01)

(52) U.S. Cl.
CPC ......... *H01M 4/661* (2013.01); *H01M 4/0404* (2013.01); *H01M 4/667* (2013.01); *H01M 10/0525* (2013.01)

(58) Field of Classification Search
CPC .... H01M 4/661; H01M 4/0404; H01M 4/667; H01M 10/0525
See application file for complete search history.

(56) References Cited

U.S. PATENT DOCUMENTS 7,790,272 B2 *  9/2010  Osada ................. H01M 50/131
                                                              428/480
2004/0151985 A1  8/2004  Munshi
(Continued)

FOREIGN PATENT DOCUMENTS

CN    102918092 A  *  2/2013  ............. B29C 55/12
CN    104428929 A     3/2015
(Continued)

OTHER PUBLICATIONS https://amesweb.info/Materials/Linear-Thermal-Expansion-Coefficient-Metals.aspx (Year: 2013).*
(Continued)

*Primary Examiner* — Daniel S Gatewood
(74) *Attorney, Agent, or Firm* — Wolf, Greenfield & Sacks, P.C.

(57) ABSTRACT

A current collector comprising a biaxially oriented polymeric substrate layer and a first metal layer on a side of the polymeric substrate layer, wherein the polymeric substrate layer exhibits positive thermal expansion in air at 200° C. in each of the transverse direction (TD) and machine direction (MD). The polymeric substrate layer has a thickness of no more than 12 pm and the first metal layer has a thickness of no more than 1000 nm.

29 Claims, 2 Drawing Sheets

(56) References Cited

U.S. PATENT DOCUMENTS

Figure 1A:
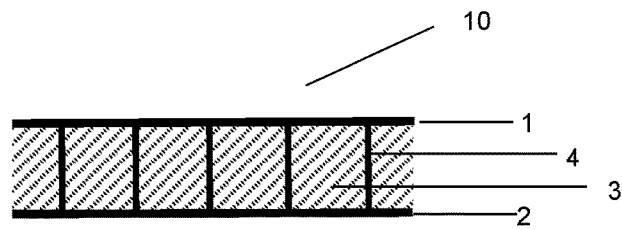

| | | |
|---|---|---|
| 2006/0181500 A1 | 8/2006 | Murade |
| 2012/0315537 A1 | 12/2012 | Ravdel et al. |
| 2014/0000706 A1* | 1/2014 | Mandokoro ........ H01L 31/0481 |
| | | 136/262 |
| 2014/0120377 A1 | 5/2014 | MacKerron et al. |
| 2017/0155155 A1 | 6/2017 | Abdelmalak et al. |
| 2019/0081315 A1* | 3/2019 | Morin ................ H01M 10/0525 |
| 2019/0305320 A1* | 10/2019 | Liang .................... H01M 4/661 |
| 2020/0373584 A1 | 11/2020 | Morin et al. |

FOREIGN PATENT DOCUMENTS

| | | |
|---|---|---|
| CN | 109994740 A | 7/2019 |
| EP | 1 551 070 A1 | 7/2005 |
| JP | 2014220187 A * | 11/2014 |
| JP | 2019-186202 A | 10/2019 |

OTHER PUBLICATIONS

GB2106834.1, Nov. 5, 2021, Search Report under Section 17(5).
PCT/GB2022/051215, Oct. 28, 2022, International Search Report and Written Opinion.
PCT/GB2022/051215, Mar. 20, 2023, International Preliminary Report on Patentability (Chapter 2).
Search Report under Section 17(5) for GB Application No. GB2106834.1 dated Nov. 5, 2021.
International Search Report and Written Opinion for International Application No. PCT/GB2022/051215 dated Oct. 28, 2022.
International Preliminary Report on Patentability (Chapter 2) for International Application No. PCT/GB2022/051215 dated Mar. 20, 2023.

* cited by examiner

CURRENT COLLECTORS COMPRISING METALLISED FILMS

CROSS-REFERENCE TO RELATED APPLICATIONS

This application is a national stage filing under 35 U.S.C. § 371 of International Application No. PCT/GB2022/051215, filed May 13, 2022, which claims the benefit of United Kingdom Application No. GB 2106834.1, filed May 13, 2021, each of which is hereby incorporated herein by reference in its entirety.

This invention relates to polymeric films for use in a current collector, to current collectors and other articles made therefrom, and to methods for their manufacture. In particular, the present invention is concerned with current collectors for use in batteries, particularly lithium-ion batteries.

Lithium-ion batteries are widely used in the field of rechargeable batteries which is set to continually grow over the foreseeable future due, in part, to the increasing demand for consumer electronics and storage of renewable energy. During battery operation (i.e. during charging and discharging), lithium ions are transferred between the anode material and the cathode material. Commercially available lithium-ion batteries typically contain metal foil current collectors, wherein a metal foil is placed in contact with each of the active solid electrodes. Generally, an aluminium-based foil is used as the cathode current collector and is disposed in contact with the cathode, whereas a copper-based foil is used as the anode current collector and is disposed in contact with the anode. In some arrangements, the cathode material may be coated on the cathode current collector and/or the anode material may be coated on the anode current collector.

However, there are problems with such existing metal foil current collectors. Firstly, the metal foil current collectors have a high conductivity which can contribute to an excessive current flow throughout the battery, leading to short-circuiting and over-heating thermal run-away, which can result in fires. Secondly, the metal foil current collectors are relatively thick, dense and heavy (typically having a thickness of over 12 μm) and hence contribute significantly to the overall mass of the battery. It would be desirable to provide current collectors which are thinner and/or lighter, in order to increase the energy density and minimise the size and mass of the batteries. However, it is challenging to provide a current collector which is thinner without detrimentally affecting its mechanical strength. To that end, metallised polymeric film current collectors have been developed. Such current collectors contain an insulating or dielectric polymeric substrate layer and conductive metal layer(s) on the surface(s) thereof. As is known in the art, such current collectors act as an electrochemical fuse which breaks at pre-determined thermal and/or electrical loads in order to avoid excessive current flow and thermal run-away. The metal layer is typically formed by a metal deposition process, which may require multiple deposition steps. During said metal deposition process, and during subsequent fabrication of the battery, the current collector (and the polymeric substrate layer within the current collector) is exposed to conditions of elevated temperature for extended times, which can lead to film overheating and permanent film damage such as deformations and wrinkles and consequently to loss of adhesion between the metal layer and the polymeric substrate layer.

It is an object of the invention to address one or more of the aforementioned problems. In particular, it is an object of the present invention to provide improved current collectors for use in batteries, preferably for use in a lithium-ion battery. It is a particular object of the invention to provide current collectors which exhibit improved adhesion between the polymeric substrate layer and the metal layer(s), particularly following exposure to elevated temperature for extended time periods, for instance during manufacture, subsequent fabrication steps and/or end-use. It is also a particular object of the invention to provide current collectors which at least maintain, and preferably improve, the energy density of existing metal foil current collectors.

According to a first aspect of the invention, there is provided a current collector comprising a biaxially oriented polymeric substrate layer and a first metal layer on a side of the polymeric substrate layer, wherein the polymeric substrate layer exhibits positive thermal expansion in air at 200° C. (and preferably no more than 3.0%) in each of the transverse direction (TD) and the machine direction (MD), wherein the polymeric substrate layer has a thickness of no more than 12 μm, and wherein the first metal layer has a thickness of no more than 1000 nm.

Preferably, the current collector further comprises a second metal layer, wherein the first metal layer and the second metal layer are on opposing sides of the polymeric substrate layer, and wherein the layer order is first metal layer/polymeric substrate layer/second metal layer. Where present, the second metal layer has a thickness of no more than 1000 nm.

The present inventors have unexpectedly found that such a current collector exhibits excellent delamination resistance between the biaxially oriented polymeric substrate layer and the first metal layer and, where present, the second metal layer, even following prolonged exposure to elevated temperatures. This is particularly advantageous in the field of lithium-ion batteries which, during manufacture and in use, are liable to be subjected to such conditions.

The first metal layer and, where present, the second metal layer are the outermost layers of the current collector.

Thus, the current collector comprises at least two layers. Preferably, first metal layer (A) is disposed directly on a first surface of the polymeric substrate layer (B) to form an AB-layer structure, i.e. wherein there is no intervening layer between the metal layer and the polymeric substrate layer, and thus, in this embodiment the current collector consists of two layers.

Preferably, the current collector comprises at least three layers. Preferably, first metal layer (A) is disposed directly on a first surface of the polymeric substrate layer (B) and second metal layer (C) is disposed directly on the second, opposite surface of the substrate layer to form an ABC-layer structure, i.e. wherein there is no intervening layer between the metal layers and the polymeric substrate layer, and thus, in this embodiment the current collector consists of three layers.

The substrate layer is a self-supporting film, by which is meant a film capable of independent existence in the absence of a supporting base.

The term polymer as used herein refers to a polymer or copolymer.

Thermoplastic polymeric materials are preferred. Such materials include a homopolymer or copolymer of a 1-olefin, such as ethylene, propylene and but-1-ene; a polyamide; a polycarbonate; PVC; PVA; polyacrylates; celluloses and a polyester. Polyolefins and polyesters, particularly polyesters, particularly linear polyesters, are preferred.

The term polyester as used herein refers to a homopolyester or copolyester derived from one or more diols at least one of which is an aliphatic diol, and one or more dicarboxylic acids at least one of which is an aromatic dicarboxylic acid. Suitable dicarboxylic acids include terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydro-terephthalic acid or 1,2-bis-p-carboxyphenoxyethane (optionally with a monocarboxylic acid, such as pivalic acid). Suitable diols include aliphatic diols and cycloaliphatic diols, such as ethylene glycol, 1,3-propanediol, 1,4-butanediol, neopentyl glycol and 1,4-cyclohexanedimethanol. Preferably, the aromatic dicarboxylic acid is selected from terephthalic acid and 2,5-, 2,6- or 2,7-naphthalenedicarboxylic acid, preferably from terephthalic acid and 2,6-naphthalenedicarboxylic acid. Preferably, the aliphatic diol is ethylene glycol. Preferably the polyester is a homopolyester.

The preferred polyethylene terephthalate (PET) and polyethylene naphthalate (PEN) polyesters may optionally comprise, as one or more comonomer(s), relatively minor amounts (preferably less than 10% by weight or less than 5% by weight) of one or more residues derived from other dicarboxylic acids and/or diols. Other dicarboxylic acids include isophthalic acid, phthalic acid, 1,4-, 2,5-, or 2,7-naphthalenedicarboxylic acid, 4,4'-diphenyldicarboxylic acid, hexahydroterephthalic acid, 1,10-decanedicarboxylic acid and aliphatic dicarboxylic acids of the general formula $C_nH_{2n}(COOH)_2$ wherein n is 2 to 8, such as succinic acid, glutaric acid sebacic acid, adipic acid, azelaic acid, suberic acid or pimelic acid. Other diols include aliphatic and cycloaliphatic glycols, such as diethylene glycol, propylene glycol, dipropylene glycol, 1,3-propanediol, 1,4-butane diol and 1,4-cyclohexanedimethanol. Preferably the polyester contains only one dicarboxylic acid, i.e. terephthalic acid or 2,6-naphthalene dicarboxylic acid, preferably terephthalic acid. Preferably the polyester contains only one diol, i.e. ethylene glycol.

Preferred polyolefins are selected from polyethylene or polypropylene, preferably polypropylene.

Preferred polyamides are linear aliphatic polyamides, preferably selected from: nylon 6,6; nylon 6; nylon 6.66; nylon 6,10; nylon 6,4; and blends and mixtures thereof. Nylon 6 and nylon 6,6 are particularly preferred polyamides, and nylon 6,6 is most preferred.

Preferably, the polymeric substrate layer is a PET film or a PEN film.

The polymer is the major component of the polymeric substrate layer, and makes up at least 60%, preferably at least 70%, and preferably at least 80% by weight of the total weight of the polymeric substrate layer. For example, the polymer may make up at least 85%, at least 90%, or at least 95% by weight of the total weight of the polymeric substrate layer.

The polymeric substrate layer may further comprise any other additive conventionally employed in the manufacture of polymer films. Such conventional additives may be present in minor proportion, typically no more than 35%, typically no more than 20%, typically no more than 5%, typically no more than 2% by weight relative to the total weight of the layer. Thus, agents such as particulate fillers, hydrolysis stabilisers, anti-oxidants, UV-stabilisers, cross-linking agents, dyes, lubricants, radical scavengers, thermal stabilisers, surface active agents, slip aids, anti-blocking agents, flame retardants, gloss improvers, prodegradants, viscosity modifiers and dispersion stabilisers may be incorporated as appropriate. Of particular utility are particulate fillers in order to improve handling and windability during manufacture, as is well known in the art. The particulate filler is typically a particulate inorganic filler (e.g. calcium carbonate, clays, silica, zeolites, silicone beads (such as functionalized polydimethyl siloxanes), dicalcium phosphates, tricalcium phosphates, cenospheres, zeospheres, talc, titanium dioxides, barium sulfate and barium titanate). Filler particle size distributions can be monomodal, bimodal and trimodal. Preferably, the volume-weighted mean particle diameter ($D_{(4,3)}$) is in the range from 0.1 to 10 μm for a monomodal, bimodal and trimodal distribution. Preferably, the filler particle size distribution is bimodal, such that there are two maximum peaks. Preferably, the first maxima of particles has a volume-weighted mean particle diameter ($D_{(4,3)}$) of about 0.5±0.3 μm and the second maxima of particles has a volume-weight mean particle diameter ($D_{(4,3)}$) of about 1.5±0.5 μm. Particle size of the filler particles is suitably measured by laser light diffraction. Particulate inorganic fillers are present in relatively minor amounts, typically less than 5.0 wt %, typically less than 2.0 wt %, typically less than 1.0 wt %.

Formation of the polymer is readily achieved by conventional synthetic methods well-known in the art. For example, a polyester may be made by a first step of direct esterification or trans-esterification, followed by a second step of polycondensation. Preferably, the synthetic procedure further comprises a solid phase polymerisation (SSP) step to increase the molecular weight of the polymer, as is well known in the art. Suitable solid phase polymerisation techniques are disclosed in, for example, EP-A-0419400 the disclosure of which is incorporated herein by reference. Thus, SSP is typically conducted at a temperature which is 10-50° C. below the crystalline melting point ($T_M$) of the polymer but higher than the glass transition temperature ($T_g$) (or where the polyester exhibits multiple glass transition temperatures, higher than the highest glass transition temperature). An inert atmosphere of dry nitrogen or a vacuum is used to prevent degradation. In a preferred embodiment, solid phase polymerisation is carried out over 16 hours at 220° C. under vacuum.

The inherent viscosity of a polyester suitable for use in the present invention is at least 0.5 dL/g, preferably at least 0.55 dL/g, preferably at least 0.6 dL/g, preferably at least 0.7 dL/g, preferably at least 0.8 dL/g.

The polymeric substrate layer is preferably a monolayer film.

Advantageously, the film may be and preferably is manufactured in air, i.e. wherein the film is not manufactured (including the steps of extrusion, casting and stretching) under the atmosphere of an inert gas (such as nitrogen or a noble gas such as argon). Thus, the polymer compositions and films described herein are thermally stable, and do not require any special handling conditions, in particular an inert atmosphere, during manufacture or storage.

Formation of the film may be effected by conventional extrusion techniques well-known in the art. In general terms the process comprises the steps of extruding a layer of molten polymer at a temperature within a range appropriate to the melting temperature of the polymer, for instance in a range of from about 270 to about 300° C. (or, typically, no more than about 15° C., preferably no more than about 10° C., higher than the crystalline melting point of the polymer), and then rapidly quenching the extrudate to ensure that the polymer is quenched to the amorphous state. The quenched extrudate is then biaxially oriented by stretching in two mutually perpendicular directions in the plane of the film at a temperature above the glass transition temperature(s) of the polymer to achieve a satisfactory combination of mechanical and physical properties. Biaxial orientation may be achieved by sequential or simultaneous biaxial orientation. In the present invention, the films are advantageously manufactured by simultaneous biaxial orientation, for instance in a tubular process, by extruding a thermoplastic polymer tube which is subsequently quenched, reheated and then expanded by internal gas pressure to induce transverse orientation, and withdrawn at a rate which will induce longitudinal orientation. Particularly suitable simultaneous biaxial orientation processes are disclosed in EP-2108673-A and US-2009/0117362-A1, the disclosure of which processes is incorporated herein by reference.

Stretching is generally effected so that the dimension of the oriented film is from 2 to 7, preferably from 2 to 5, more preferably 2.5 to 4.5, more preferably 3.0 to 4.5, more preferably 3.0 to 4.0 times its original dimension in each direction of stretching. Preferably, the film is stretched from 3.2 to 3.6 times its original dimension in the machine direction (MD) and preferably from 3.3 to 3.8 times its original dimension in the transverse direction (TD). Stretching is effected at temperatures higher than the $T_g$ of the polymer composition, preferably at least about 5° C. higher, preferably at least about 15° C. higher than the $T_g$, and preferably in the range of from about $T_g+5°$ C. to about $T_g+75°$ C., preferably from about $T_g+5°$ C. to about $T_g+30°$ C. Thus, typically stretching is effected at temperatures in the range of about 5 to about 155° C., preferably about 5 to about 145° C. Where the polymer composition is PET, stretching is typically effected at temperatures in the range of about 85 to about 110° C., preferably about 95 to about 100° C. Where the polymer composition is PEN, stretching is typically effected at temperatures in the range of about 130 to about 155° C., preferably about 140 to about 145° C. It is not necessary to stretch equally in the machine and transverse directions although this is preferred if balanced properties are desired.

The stretched film is then dimensionally stabilised. In a first step, the film is annealed under dimensional support (or restraint) to induce the desired crystallinity of the polymer. A temperature of at least about 200° C. is preferred. Preferably, the temperature used is above the glass transition temperature(s) of the polymer but below the melting temperature ($T_M$) thereof. Within these constraints, preferred annealing temperatures are typically from about 80° C. less than the melting temperature of the film (i.e. $T_M-80°$ C.) to about 10° C. less than $T_M$ (i.e. $T_M-10°$ C.), preferably from about $T_M-70°$ C. to about $T_M-20°$ C. Thus, the annealing temperature is suitably in the range of from about 200 to about 245° C., preferably from about 215 to about 245° C., preferably from about 220 to about 245° C., preferably in the range of from about 220 to about 240° C. The time at which the film is held at this temperature is preferably in the range of 0 to 60 seconds, preferably 0.1 to 10 seconds, preferably 0.5 to 5 seconds, preferably 0.7 to 3 seconds.

After annealing under dimensional restraint, the films are then subjected to dimensional relaxation in both the transverse direction (TD) and machine direction (MD). Dimensional relaxation may be achieved by sequential or simultaneous dimensional relaxation, preferably sequential. The relaxation step is suitably an in-line relaxation step, i.e. a stage in the film manufacturing line. The relaxation of the film is from about 0.5 to about 5.0%, preferably from about 1.0 to about 4.0%, preferably from about 1.0 to 3.0%, preferably from about 1.0 to about 2.0%, in each of the transverse direction (TD) and machine direction (MD). The degree of relaxation in the machine and transverse directions may be the same. However, if balanced properties are desired, it is preferred that the degree of relaxation in the machine and transverse directions are not the same. In the relaxation step, the film is heated at a temperature which is preferably no higher than that of the immediately preceding annealing step, and with a lower MD and TD tension. MD relaxation is controlled by reducing the speed of the film line, while TD relaxation is controlled by reducing the distance between the film clamps on opposing lateral edges of the film, each of which results in a decrease in the tension experienced by the film in the relevant dimension at this stage of manufacture. A temperature of at least about 200° C. is preferred, preferably from about 200° C. to about 250° C., preferably from about 200° C. to about 245° C., preferably from about 200° C. to about 240° C., preferably from about 210° C. to about 230° C., preferably from about 215° C. to about 230° C., preferably from about 215° C. to 225° C. The duration of heating of the relaxation step will depend on the temperature used but is typically in the range of 0 to 30 seconds, preferably 0.1 to 10 seconds, preferably 0.4 to 4 seconds, preferably 0.9 to 3.8 seconds.

Preferably a second relaxation step is then conducted (in which case the relaxation step described above is referred to as the first relaxation step). The second relaxation step is effected in a similar way to that described for the first relaxation step. A temperature of at least about 195° C. is preferred, and a temperature of at least about 200° C. is most preferred. The second relaxation step may be effected at a similar temperature to the first relaxation step. Alternatively, the second relaxation step may be conducted at a lower temperature than the first relaxation step, preferably at least about 5° C. lower. Thus, preferably the second relaxation step is conducted in the range of from about 195° C. to about 245° C., preferably from about 195° C. to about 240° C., preferably from about 195° C. to about 235° C., preferably from about 195° C. to about 230° C., preferably from about 195° C. to about 220° C., preferably from about 195° C. to about 215° C. The duration of heating of the second relaxation step will depend on the temperature used but is typically in the range of 0 to 30 seconds, preferably 0.1 to 10 seconds, preferably 0.4 to 3.5 seconds, preferably 0.7 to 3.0 seconds.

After the annealing step and relaxation step(s), the film is rapidly cooled.

The inventors have found that the resulting polymeric film exhibits high dimensional stability at elevated temperatures and positive thermal expansion at 200° C. in each of the transverse direction (TD) and the machine direction (MD). The thermal response of the polymeric substrate layer in each of the machine and transverse directions is therefore aligned with that of the metal layer(s), and the current collectors of the present invention exhibit high dimensional stability, without deformation, warping or delamination during subsequent processing at elevated temperatures (e.g. during metal deposition or during subsequent battery formation). In contrast, the prior art current collectors in which the polymeric substrate layers have not been manufactured using the annealing and relaxation process described herein exhibit shrinkage and dimensional instability, and are observed to deform and warp during subsequent processing at elevated temperatures and exhibit poor delamination resistance.

Preferably, the polymeric substrate layer exhibits thermal expansion in air at 200° C. of from greater than 0% to no more than 3.0%, preferably from greater than 0% to no more than 2.0%, preferably from 0.1% to 2.0%, preferably from 0.2% to 1.5% in each of the transverse direction (TD) and in the machine direction (MD). Preferably, the polymeric substrate layer exhibits isotropic thermal expansion, i.e. the layer expands by the same amount in the TD and in the MD.

The inventors have found that the manufacturing steps, particularly the annealing and relaxation process described herein, can be conducted such that the polymeric substrate film exhibits isotropic thermal expansion. In particular, the degree of dimensional relaxation in the MD and TD in the relaxation process described herein can be controlled. For example, the degree of dimensional relaxation effected in the MD and TD can be different in order to counteract any residual deformation in the MD or TD resulting from prior manufacturing steps, such that the final resulting polymeric film exhibits balanced properties and hence isotropic thermal expansion.

Preferably, the polymeric substrate layer exhibits a positive coefficient of linear thermal expansion (CLTE) in air over the range of 32° C. to 200° C., preferably a positive CLTE of less than $20 \times 10^{-5}/°$ C., preferably a positive CLTE of less than $17 \times 10^{-5}/°$ C., preferably a positive CLTE of less than $10 \times 10^{-5}/°$ C., preferably a positive CLTE of less than $9 \times 10^{-5}/°$ C., preferably a positive CLTE of less than $8.5 \times 10^{-5}/°$ C. in each of the transverse direction (TD) and the machine direction (MD).

The thickness of the polymeric substrate layer is no more than 12.0 μm, preferably no more than 10.0 μm, preferably no more than 8.0 μm, preferably no more than 6.0 μm. The thickness of the polymeric substrate layer is preferably at least 1.0 μm, preferably at least 2.0 μm, preferably at least 3.0 μm, preferably at least 4.0 μm. Thus, the thickness of the polymeric substrate layer is preferably from 1.0 to 12.0 μm, preferably from 2.0 to 8.0 μm, preferably from 4.0 to 8.0 μm, preferably from 4.0 to about 6.0 μm.

The first metal layer and, where present, the second metal layer are each formed from a metallic conductive material. Preferably, the first and second metal layers comprise the same metallic conductive material. Alternatively, the first and second metal layers may comprise different metallic conductive materials. The metallic conductive material is preferably selected from at least one of aluminium, copper, nickel, titanium, silver, nickel-copper alloy, or aluminium-zirconium alloy. Preferably, the metallic conductive material is aluminium or copper. Where the current collector is a cathode current collector, the first metal layer and, where present, the second metal layer preferably comprise aluminium. Where the current collector is an anode current collector, the first metal layer and, where present, the second metal layer preferably comprise copper.

Where the first metal layer and, where present, the second metal layer comprise aluminium, preferably the polymeric substrate layer is a PET film. Where the first metal layer and, where present, the second metal layer comprise copper, preferably the polymeric substrate layer is a PEN film.

The metal layer(s) preferably comprises at least 90%, preferably at least 95%, preferably at least 98% and preferably at least 99% by weight of the aforementioned metallic conductive material, the stated weights of metallic conductive material being the percent by weight relative to the total weight of the metal layer. In a preferred embodiment, the metal layer consists of metallic conductive material.

The metal layer(s) exhibit positive thermal expansion coefficients. Preferably, the first metal layer and, where present, the second metal layer in the current collectors of the present invention independently exhibit thermal expansion in air at 200° C. of from greater than 0% to no more than 2.0%, preferably from greater than 0% to no more than 1.0%, preferably from 0.25% to 0.75%, preferably of from 0.3 to 0.5%. Each of the metal layers in the current collectors of the present invention preferably exhibit isotropic thermal expansion, i.e. the layers expand by the same amount in orthogonal directions, for instance in the directions corresponding to the machine and transverse dimensions of the polymeric substrate layer. Preferably the first metal layer and the second metal layer exhibit the same expansion at 200° C. as each other.

Preferably, the ratio of the thermal expansion in air at 200° C. of the polymeric substrate layer in the transverse direction to the thermal expansion in air at 200° C. of each of the first and second metal layers is from 1:5 to 5:1, preferably from 2:1 to 1:2, preferably from 1.5:1 to 1:1.5, preferably from 1.2:1 to 1:1.2:1, preferably about 1:1.

Preferably, the ratio of the thermal expansion in air at 200° C. of the polymeric substrate layer in the machine direction to the thermal expansion in air at 200° C. of each of the first and second metal layers is from 1:5 to 5:1, preferably from 1.5:1 to 1:1.5, preferably from 1.2:1 to 1:1.2, preferably about 1:1.

Preferably, the first metal layer and, where present, the second metal layer independently exhibits a positive coefficient of linear thermal expansion (CLTE) in air at 100° C. of from about $10 \times 10^{-6}/°$ C. to about $30 \times 10^{-6}/°$ C., preferably from about $12 \times 10^{-6}/°$ C. to about $18 \times 10^{-6}/°$ C.

Preferably, the thickness of each of the first metal layer and, where present, the second metal layer is independently in the range of from about 50 nm to about 1000 nm, preferably from about 100 nm to about 1000 nm, preferably from about 100 nm to about 800 nm, preferably from about 150 nm to about 700 nm.

Each of the first metal layer and, where present, the second metal layer are suitably deposited onto the polymeric substrate layer. Any suitable deposition technique well-known in the art for the manufacture of metallized films may be used, including at least one of vapor deposition and electro-less plating. Preferably, the first and second metal layers are independently deposited onto the polymeric substrate layer by at least one of vapor deposition and electro-less plating. The vapor deposition may be at least one of physical vapor deposition (PVD), virtual cathode deposition (VCD) or chemical vapor deposition (CVD).

Preferably, the physical vapor deposition is selected from at least one of evaporation deposition and sputtering deposition. The evaporation deposition is preferably at least one of vacuum evaporation, thermal evaporation, or electron beam evaporation techniques. The sputtering deposition is preferably magnetron sputtering. Suitable processes include, for instance, plasma-enhanced vapour deposition techniques, such as plasma-enhanced electron beam evaporation techniques, and plasma-enhanced sputtering techniques.

Preferably, thermal evaporation deposition, electron beam evaporation or virtual cathode deposition is used to dispose the metal layer(s).

Typically, thermal evaporation deposition comprises placing a polymeric substrate and a source material within a vacuum chamber. The source material is heated under vacuum (preferably below $10^{-4}$ Pa) and high temperature until it evaporates. The evaporated source material particles disperse towards the substrate and condense at the substrate surface to form a thin film. Typically, a resistive coil in the form of a powder or solid bar is subjected to a large direct current (preferably in the range of 100 to 150 mA for a period of 10 to 15 seconds), which thus generates the heat used to evaporate the source material. Suitable apparatus includes those commercially available under the name "BAE 370" from Balzers AG (Liechtenstein), or equipment commercially available from Bühler and Applied Materials.

Typically, electron beam evaporation comprises evaporating a source material using high energy electrons in the form of an intense beam. A hot filament is used to thermionically emit electrons which are used, after acceleration, to evaporate the source material.

Typically, virtual cathode deposition comprises supplying a high voltage pulse to a virtual plasma cathode in order to generate a high energy density electron beam (preferably wherein the energy is greater than 100 MW/cm$^2$). The high energy density electron beam ablates a solid target, such that a portion (e.g. about 0.001 mm$^3$) of the ablated target material forms a plasma. The plasma propagates in the form of a plasma flume towards the polymeric substrate. The plasma flume may have a velocity of up to about 50 km/s. The target material plasma condenses at the substrate surface to form a thin film. For example, a thin film of up to 0.1 nm thickness may form per pulse at 400 cm$^2$. Repeating the high voltage pulses (e.g. up to a frequency of about 600 Hz) and/or using an apparatus comprising multiple virtual cathode groups allows the deposited film to grow until the desired thickness is reached. Suitable virtual cathode deposition methods and apparatus are known and include, for instance, the methods and apparatus as discussed in WO-2016/042530-A and in US-2020/0095129-A, and the disclosures of said methods and apparatus are incorporated herein by reference.

The deposition technique may require a single-pass or multiple-passes (such as a double-pass) in order to deposit a metal layer of the desired thickness. Preferably, the deposition technique requires a single-pass, which advantageously increases manufacturing efficiency and minimises the exposure of the polymeric substrate to conditions of elevated temperature for extended time.

As will be appreciated by the skilled person, the current collector is required to exhibit electrical conductivity when disposed in the battery. Thus, conductivity must be allowed between the outer surfaces of the current collector despite the electrical insulation conferred by the polymeric substrate layer. For example, conductivity must be allowed from the first metal layer to the second metal layer (where present), despite the electrical insulation conferred by the polymeric substrate layer positioned between the first and second metal layers.

In one embodiment, referred to herein as Arrangement 1, the current collector further comprises at least one conductive tab which connects the first metal layer and the second metal layer such that the current collector exhibits electrical conductivity from one surface to the other surface thereof. Such conductive tabs are known in the art, and disclosed for instance in WO-2019/051123-A and U.S. Ser. No. 10/700, 339-B. Preferably, the tab extends beyond the periphery of the current collector, such that the tab is capable of connecting the current collector with other components within the battery. Preferably, the tab extends from the interior to the exterior of the lithium-ion battery, such that the tab is capable of connecting the battery to an external source.

Figure 1B:
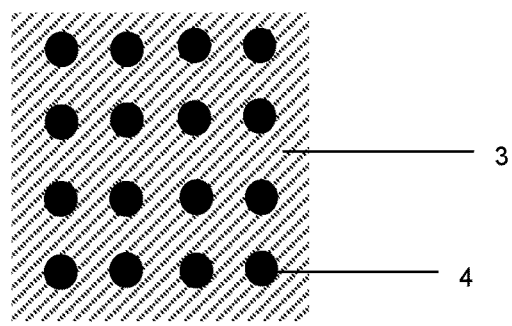

In another embodiment, referred to herein as Arrangement 2, the polymeric substrate layer comprises channels which extend from the first surface to the second, opposite surface thereof wherein (i) the sides of the channels are at least partially coated with at least one metal, and/or (ii) the channels are at least partially filled with at least one metal, preferably such as to generate conductive pathways between the first and second metal layers. Such channels are known in the art, and disclosed for instance in US-2019/0305320-A. The channels may have an aperture size (e.g. diameter) in the range of from about 1 μm to about 5 mm. The fraction of the surface area of the polymeric substrate layer made up of channel apertures is typically from about 0.01 to about 10%. Such channels allow a further reduction in weight of the battery, as well as improving its electrochemical properties such as charge-discharge rates and cycle life. Said metal is preferably deposited during the metal deposition step(s) used to deposit the first and second metal layers described hereinabove, and preferably the virtual cathode deposition technique. Arrangement 2 is further illustrated in FIG. 1. FIG. 1A shows, in cross section, the current collector arrangement. The current collector (10) has a biaxially oriented substrate layer (B) (3), a first metal layer (A) (1) and a second metal layer (C) (2), wherein the current collector has an ABC-layer structure. The substrate layer (B) has multiple perforated holes which are filled with metal (4). The metal forms a continuous connection between the first metal layer (A) and the second metal layer (C). FIG. 1B shows, in top view, the substrate layer (B) in the current collector arrangement.

Arrangement 1 and Arrangement 2 may be present in the same battery.

The total thickness of the current collector of the present invention is preferably from about 1 μm to about 12 μm, preferably from about 2 μm to about 8 μm and preferably from about 4 μm to about 8 μm, preferably from about 4 to about 6 μm.

Preferably, the current collector exhibits a sheet resistance no more than about 2.0 $\Omega sq^{-1}$, preferably of no more than about 1.5 $\Omega sq^{-1}$, preferably of no more than about 1.0 $\Omega sq^{-1}$. Preferably, the current collector exhibits a sheet resistance of at least about 0.01 $\Omega sq^{-1}$, preferably of at least about 0.02 $\Omega sq^{-1}$, preferably of at least about 0.05 $\Omega sq^{-1}$. Preferably the current collector exhibits a sheet resistance of from about 0.01 $\Omega sq^{-1}$ to about 2.0 $\Omega sq^{-1}$, preferably from about 0.02 $\Omega sq^{-1}$ to about 2.0 $\Omega sq^{-1}$, preferably from about 0.02 $\Omega sq^{-1}$ to about 1.5 $\Omega sq^{-1}$, preferably from about 0.05 $\Omega sq^{-1}$ to about 1.0 $\Omega sq^{-1}$.

Preferably, the current collector exhibits a breakdown current of no more than about 35 A, preferably no more than about 30 A, preferably no more than about 20 A, preferably no more than about 10 A, preferably no more than about 5 A. Preferably, the current collector exhibits a breakdown temperature of no more than about 300° C., preferably no more than about 250° C., preferably no more than about 240° C., preferably no more than about 230° C., and preferably no more than about 220° C. In a preferred embodiment, the breakdown temperature is no more than the crystalline melting point ($T_M$) of the polymer which makes up the major component of the polymeric substrate layer, and typically corresponds to the point at which the polymeric layer starts to shrink. Thus, when the polymeric substrate layer is a PEN film, the current collector preferably exhibits a breakdown temperature of no more than about 270° C., preferably of no more than about 260° C., preferably of no more than about 250° C., preferably of no more than about 220° C. When the polymeric substrate layer is a PET film, the current collector preferably exhibits a breakdown temperature of no more than about 260° C., preferably of no more than about 250° C., preferably of no more than about 220° C. The breakdown current and temperature correspond to the points at which the current collector fails, i.e. the points at which the film acts as an electrochemical fuse to successfully prevent excessive current flow and risk of thermal propagation in the battery.

Preferably, the adhesion strength between a metal layer and the polymeric substrate layer is least 600 g/25 mm, preferably at least about 700 g/25 mm, preferably at least about 800 g/25 mm.

According to a second aspect of the present invention, there is provided a method of manufacturing a current collector as described herein, wherein the method comprises the steps of
(i) forming a biaxially oriented polymeric substrate layer; and
(ii) depositing a metal on a first surface of said substrate layer to form a first metal layer.

Preferably, the method further comprises the step of
(iii) depositing on a second surface of said substrate layer a metal to form a second metal layer;
such that the layer order is first metal layer/polymeric substrate layer/second metal layer.

Prior to application of a metal layer, the exposed surface of the biaxially oriented polymeric substrate layer may, if desired, by subjected to a chemical or physical surface-modifying treatment to improve the bond between the polymeric substrate layer and the subsequently applied layer. It is particularly advantageous to subject the exposed surface of the polymeric substrate layer to such a treatment prior to deposition of the metal layer.

A preferred treatment is to subject the exposed surface of the substrate layer to a plasma treatment. The plasma treatment comprises exposing the surface to discharge caused and maintained by imposing a high voltage in a low pressure gas atmosphere, that is, so-called glow discharge. The surface is treated with activated particles of electrons, ions, excited atoms, excited molecules, radicals, and ultraviolet rays formed during this glow discharge. One or more agents known in the art may be injected into the glow discharge and onto the substrate. The one or more agents may be deposited to form a coating on the exposed surface. Known agents include organic molecules, inorganic molecules and biomolecules. Preferred agents include a mixture of acrylic acid and methacrylic anhydride, (3-Glycidyloxypropyl)trimethoxysilane, N-(3-Trimethoxysilylpropyl) diethylenetriamine or (3-Mercaptopropyl)trimethoxysilane. For example, suitable mixtures of acrylic acid and methacrylic anhydride include mixtures comprising 75% by weight of acrylic acid and 25% by weight of methacrylic anhydride, or mixtures comprising 50% by weight of acrylic acid and 50% by weight of methacrylic anhydride.

A preferred plasma treatment is corona treatment (sometimes referred to as air plasma), in which the exposed surface of the polymeric substrate layer is subjected to a high voltage electrical stress accompanied by corona discharge. The preferred treatment by corona discharge may be effected in air at atmospheric pressure with conventional equipment using a high frequency, high voltage generator, preferably having a power output of from 1 to 20 KW at a potential of 1 to 100 kV. Discharge is conventionally accomplished by passing the film over a dielectric support roller at the discharge station at a linear speed preferably of 1.0 to 500 m per minute. The discharge electrodes may be positioned 0.1 to 10.0 mm from the moving film surface.

Following plasma treatment, the polymeric substrate layer preferably exhibits a water contact angle of no more than about 70°, preferably of no more than about 65°, preferably of no more than about 60°. Following plasma treatment, the polymeric substrate layer preferably exhibits a water contact angle of at least about 5°, preferably of at least about 10°, preferably of at least about 14°. Preferably, following plasma treatment, the polymeric substrate layer exhibits a water contact angle of from about 5° to about 70°, preferably from about 10° to about 65°, preferably from about 14° to about 60°.

The water contact angle between a droplet of HPLC-grade water and the polymeric substrate layer may be measured with the Surface Analyst 3001 (BTG Labs).

Following plasma treatment, the polymeric substrate layer preferably exhibits a surface energy of from about 30 mN/m to about 100 mN/m, preferably from about 30 to about 80 mN/m. The surface energy can be measured by an ink-based surface energy test, such as a Dyne level test following ISO 8296.

The description and preferences of the first aspect are equally applicable to the second aspect.

According to a third aspect of the invention, there is provided the use of a biaxially oriented polymeric film as a substrate in a current collector which further comprises a first metal layer, wherein said use is for imparting improved adhesion strength and/or delamination resistance between said substrate and metal layer, and wherein the biaxially oriented polymeric substrate layer exhibits positive thermal expansion in air at 200° C. in each of the transverse direction (TD) and the machine direction (MD), wherein the polymeric substrate layer has a thickness of no more than 12 µm, and wherein the first metal layer has a thickness of no more than 1000 nm.

Preferably, the current collector further comprises a second metal layer, wherein the current collector layer order is first metal layer/polymeric substrate layer/second metal layer and wherein the second metal layer has a thickness of no more than 1000 nm.

The description and preferences of the first and second aspects are equally applicable to the third aspect.

According to a fourth aspect of the invention, there is provided a battery comprising an anode material, an anode current collector, a cathode material, a cathode current collector and a separator situated between the anode material and the cathode material, wherein at least one of said current collectors is the current collector as described herein.

The battery may be selected from a lithium-ion battery, a lithium-sulfur (LiS) battery, a lithium-air ($LiO_2$) battery or a sodium-ion battery. Preferably, the battery is a lithium-ion battery, a lithium-sulfur (LiS) battery or a lithium-air ($LiO_2$) battery. Preferably, the battery is a lithium-ion battery. Preferably, the battery is a sodium-ion battery.

Any suitable anode material, cathode material and separator, as conventional in the art, may be used.

The anode material may be selected from graphite and/or lithium titanate (LTO).

The cathode material may be selected from lithium or mixed oxides of lithium and other metal(s), particularly lithium titanate (LTO), lithium iron phosphate ($LiFePO_4$, also known as LFP) and/or lithium-nickel-manganese-cobalt oxide ($LiNiMnCoO_2$, also known as NMC).

The separator may be a polymeric, ceramic, non-woven or fabric separator. Suitable polymeric separators are disclosed in, for example, WO-2019/186173-A and WO-2021/064359-A, the disclosures of which are incorporated herein by reference.

The battery (preferably the lithium-ion battery) may further comprise an electrolyte. Where present, the electrolyte is preferably a conductive organic solvent which may saturate the other materials present in the battery, thereby providing a mechanism for the ions to conduct between the anode and cathode.

Alternatively, the battery (preferably the lithium-ion battery) may be a dry-cell battery. The dry-cell battery contains a solid separator situated between the anode material and the cathode material, wherein the separator functions as both separator and electrolyte. As such, liquid electrolytes are eliminated.

In the embodiment of Arrangement 1, as described hereinabove, the current collector further comprises at least one conductive tab which connects the first metal layer and the second metal layer such that the current collector exhibits electrical conductivity from one surface to the other surface thereof. Preferably, the tab extends beyond the periphery of the current collector, such that the tab is capable of connecting the current collector with other components within the battery. Preferably, the tab extends from the interior to the exterior of the battery, such that the tab is capable of connecting the battery to an external source.

Preferably, the electrode material is coated or otherwise deposited onto the current collector.

The battery (preferably the lithium-ion battery) may have any configuration that is known in the art, including cans, pouch cells, prismatic cells, coin cells, cylindrical cells, wound prismatic cells and wound pouch cells.

The description and preferences of the first to third aspects are equally applicable to the fourth aspect.

According to a fifth aspect of the invention, there is provided the use of a current collector as described herein in a battery (preferably a lithium-ion battery) as described herein.

The description and preferences of the first to fourth aspects are equally applicable to the fifth aspect.

According to a sixth aspect of the invention, there is provided a method of manufacturing a battery (preferably a lithium-ion battery) as described herein, the method comprising the steps of:
(i) preparing a current collector as described herein;
(ii) assembling the battery (preferably the lithium-ion battery), wherein the battery comprises an anode material, a cathode material, a separator between the anode material and the cathode material, an anode current collector and a cathode current collector, wherein at least one of said current collectors is the current collector obtained from step (i).

Preferably, the anode or cathode material may be coated or otherwise deposited onto the current collector described herein using any suitable coating or deposition technique conventional in the art for electrode preparation. It will be appreciated that the anode material is coated or otherwise deposited onto the outer surface of a metal layer of an anode current collector, whereas the cathode material is coated or otherwise deposited onto the outer surface of a metal layer of a cathode current collector. High processing temperatures (e.g. around 200° C.) are used during this coating or deposition step. In a preferred embodiment, the electrode material is coated onto the current collector.

The electrode/current collector assembly is suitably dried at a temperature of from about 50° C. to about 170° C., preferably from about 80° C. to 160° C. It will be appreciated that the drying step may comprise various different temperature zones comprising an appropriate heating profile.

The dried electrode/current collector assembly is preferably compacted, for instance by calendering between a rotating pair of rollers. During calendering, said assembly may be exposed to static discharge and cleaned, for example by brushes or air flow. Optionally, all or part of the compaction step may be heated, for instance by preheating sections and/or rollers in a calendering process, for example to temperatures of from about 50° C. to about 250° C.

The description and preferences of the first to fifth aspects are equally applicable to the sixth aspect.

This invention is further illustrated with reference to the figures, as described below.

FIG. 1 shows the assembly of a current collector according to Arrangement 2, as described hereinabove. FIG. 1A shows, in cross section, the current collector. FIG. 1B shows, in top view, the substrate layer (B) in the current collector arrangement.

Figure 2A:
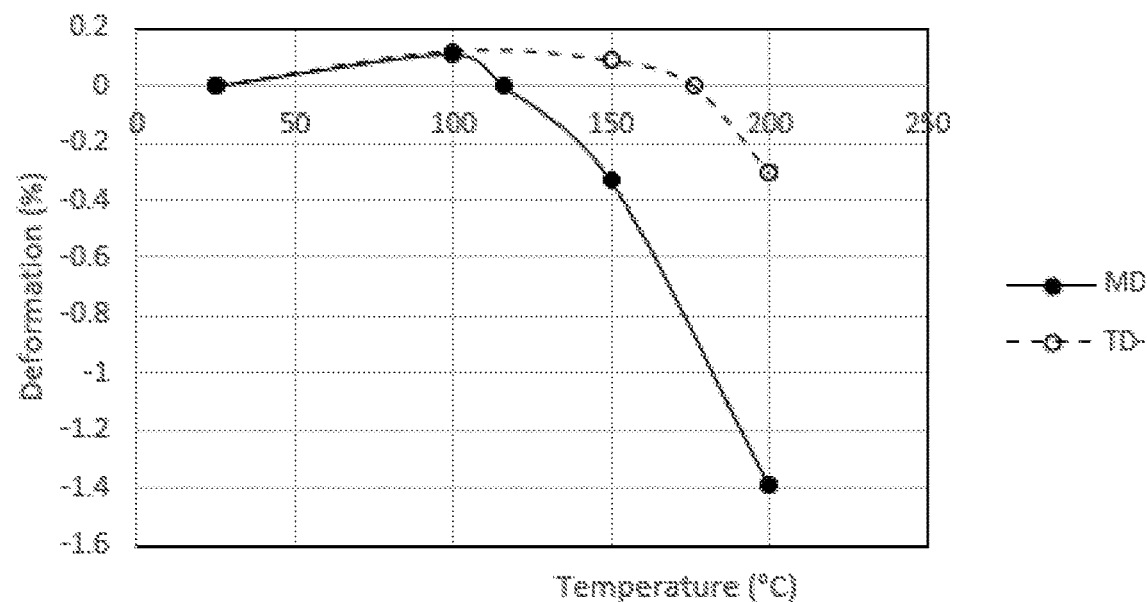

FIGS. 2A, B and C shows the TGA plots of the thermal relaxation between about 25° C. and about 200° C. of each of Examples 5 to 7, as described hereinbelow.

PROPERTY MEASUREMENT

The following test methods were used to characterise the properties of the current collectors and batteries described herein.
(i) Expansion of the Biaxially Oriented Polymeric Layer A sample of the biaxially oriented polymeric layer having dimensions of 5 mm×8 mm was subjected to thermomechanical analysis using a thermomechanical analyser (TMA Q400 by TA Instruments Inc.). The longer dimension of the sample (i.e. the 8 mm dimension) corresponds to the sample direction for which expansion was being tested.

The sample was mounted on the apparatus and the sample was subjected in the machine direction (MD) or in the transverse direction (TD) to a load of 1 N/mm$^2$ and a temperature increase rate of 10° C./min from 32° C. to 220° C. The thermal expansion in air at a temperature of 200° C. was measured. The thermal expansion in air at 200° C. is defined as the % change of dimension of the film in the given direction (i.e. in the MD or TD), and calculated as $(L_1-L_0)/L_0 \times 100$, where $L_0$ is the dimension at 32° C. and $L_1$ is the dimension at 200° C. As the skilled person will appreciate, a negative thermal expansion indicates thermal shrinkage.
(ii) Coefficient of Linear Thermal Expansion (CLTE)

A procedure similar to that of the (i) was used. For the coefficient of linear thermal expansion measurement (b), the CLTE values were derived from the formula:

$$CLTE = (L_1 - L_0)/(L_0 \times (T_2 - T_1))$$

where $(L_1-L_0)$ is the measured change in length of the sample over the temperature range $(T_2-T_1)$, and $L_0$ is the original specimen length at 32° C. Suitably, $T_2$ was 200° C. and $T_1$ was 32° C. The data can be plotted as a function of the % change in specimen length with temperature, normalised to 32° C.
(iii) Sheet Resistance The sheet resistance of the conductive layer was measured using a linear four point probe (Jandel Model RM2) according to ASTM F390-98 (2003).
(iv) Breakdown Current and Temperature at Breakdown A current collector sample having dimensions 50 mm×10 mm was held at each end between a pair of conducting clamps. The sample was clamped such that 10 mm$^2$ at each end of the sample was held within the clamps. A current was passed through the samples at a ramp rate of 2 A/min until breakdown was observed. The temperature profile of the sample was monitored using a thermal imaging camera throughout the test, in order to determine the temperature at breakdown.

(v) Adhesion Strength of the Current Collector

The adhesion strength of the metallised polymeric substrate to an EAA (ethylene acrylic acid film) having a thickness of 25 μm (available commercially as Vistafix(TP) from UCB Sidac Division) was assessed as follows. A sample of the current collector and a sample of the EAA film were positioned together such that the outer surface of the metallised polymeric substrate layer was contacted with the surface of the EAA film. The samples were heat-sealed using a Sentinel Model 12 (Packaging Industries Group Inc) machine under the following conditions: 105° C. (top jaw) and 25° C. (lower jaw) for 10 seconds under a pressure of 50 psi. The sealed sample was cut into 25 mm wide strips and the adhesion strength was determined using an Instron Model 4464. The jaws were set 50 mm apart. The upper jaw held the EAA piece of the sealed sample and travelled up at a speed of 300 mm/min, while the lower jaw held the current collector piece of the sealed sample and was stationary. The average peel force was measured and reported as a mean value of 5 results. The plane of adhesion failure was also noted.

When the adhesion strength between the metal layer and the polymeric substrate layer is lower than the adhesion strength (about 800 g/25 mm) between the metal layer and the EAA film, the test sample delaminates along the interface of the metal layer and polymeric substrate layer. In this case, the average peel force represents the adhesion strength between the metal layer and the polymeric substrate layer.

When the adhesion strength between the metal layer and the polymeric substrate layer is higher than the adhesion strength (800 g/25 mm) between the metal layer and the EAA film, the test sample delaminates along the interface of the metal layer and EAA film.

A further plane of failure is coherent failure within the metallised layer itself, which also indicates that the adhesion strength between the metal layer and the polymeric substrate layer is greater than the force required to achieve coherent failure (typically the adhesion strength between the metal layer and the polymeric substrate layer is therefore greater than about 800 g/25 mm).

(vi) Delamination Resistance of the Current Collector

Delamination resistance was assessed by subjecting the current collector to elevated temperature by placing in a heated oven at that temperature, namely 5 or 10 minutes at 200° C. followed by the same time period of 5 or 10 minutes at 130° C. The adhesion strength was measured according to the method described above before and after said thermal treatment in order to assess the delamination resistance of the current collector after exposure to elevated temperature conditions which are representative of the conditions used during a typical battery manufacturing process. The delamination resistance is defined as:

$$\text{Delamination Resistance} = 100 * ((A_{TT} - A_0)/A_0)$$

wherein:
$A_{TT}$=adhesion strength of the current collector after thermal treatment
$A_0$=adhesion strength of the current collector before thermal treatment

EXPERIMENTAL

Experiment 1

The performance of current collectors according to the present invention having first and second metal (Cu or Al) layers on a polyester (PET or PEN) film substrate was investigated using the format and specification of commercially available cells. The current collector had an ABC-layer structure wherein layer A is the first metal layer, layer B is the polyester film substrate and layer C is the second metal layer. The thickness of each metal layer was 150 nm. The thickness of the polyester film substrate was 6 μm. Performance was compared against current collectors consisting of a metal foil (Cu or Al) having a thickness of 12 μm.

Four commercially available lithium ion cells were considered, in accordance with the suppliers' specifications. Example 1 was based on the A123 pouch cell for Chevrolet Spark EV (2012) with C/LFP cell chemistry, at 3.3V and 20 Ah. Example 2 was based on the Toshiba SciB High-power cell with LTO/NMC cell chemistry, at 2.4V and 2.9 Ah. Example 3 was based on the A123 cylindrical 18650 cell with C/LFP cell chemistry, at 3.3V and 1.2 Ah. Example 4 was based on a cylindrical 21700 cell with C/NMC cell chemistry, at 3.9V and 3.8 Ah.

The cell mass, energy density and power density was determined for each commercial cell comprising either the current collectors of the present invention (Examples 1-4) or the conventional foil current collectors (Comparative Examples 1-4). The results are shown in Table 1 (in which "n/m" means "not measured").

As demonstrated by the data in Table 1, the current collectors of the present invention enable the formation of cells with a significantly reduced mass compared to cells made with conventional current collectors consisting of metal foils. Thus, lithium-ion batteries with reduced mass, improved energy density and improved power density can be produced using the current collectors of the present invention.

TABLE 1

| Example | Cell mass (g) | | | Energy density (Wh/kg) | | | Power density (W/kg) | | |
|---|---|---|---|---|---|---|---|---|---|
| | Comparative | Inventive | Improvement (%) | Comparative | Inventive | Improvement (%) | Comparative | Inventive | Improvement (%) |
| 1 | 267 | 240 | 10 | 247 | 275 | 11 | n/m | n/m | n/m |
| 2 | 150 | 135 | 10 | 46 | 52 | 13 | 3200 | 3563 | 11 |
| 3 | 40 | 35 | 13 | 99 | 113 | 14 | 2700 | 3086 | 14 |
| 4 | 71 | 62 | 13 | 207 | 239 | 15 | n/m | n/m | n/m |

Experiment 2

Figure 2B:
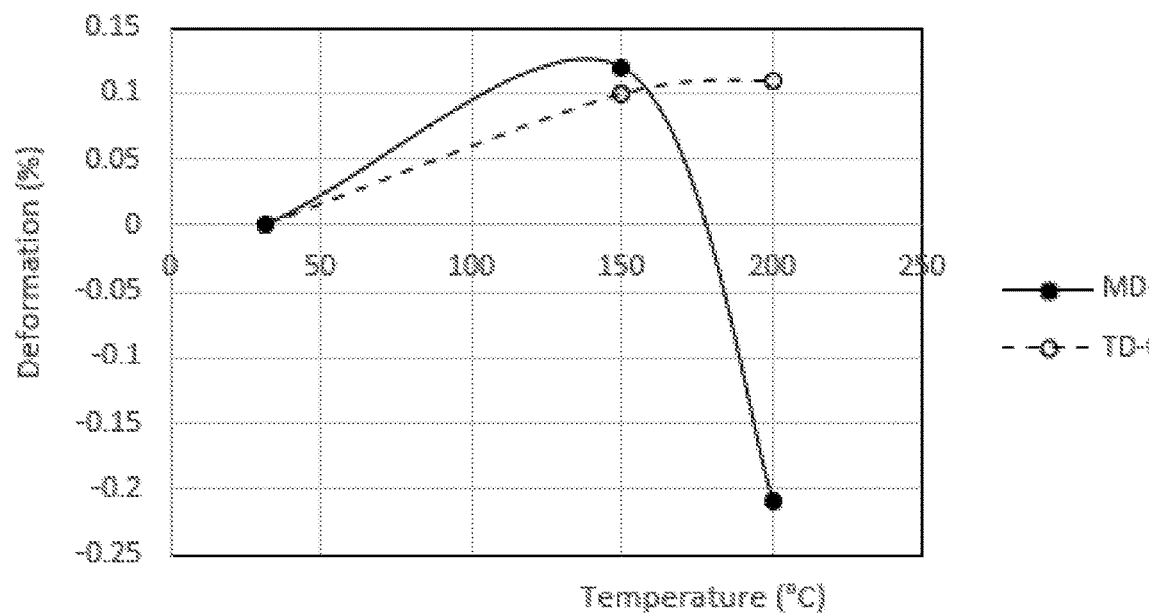
Figure 2C:
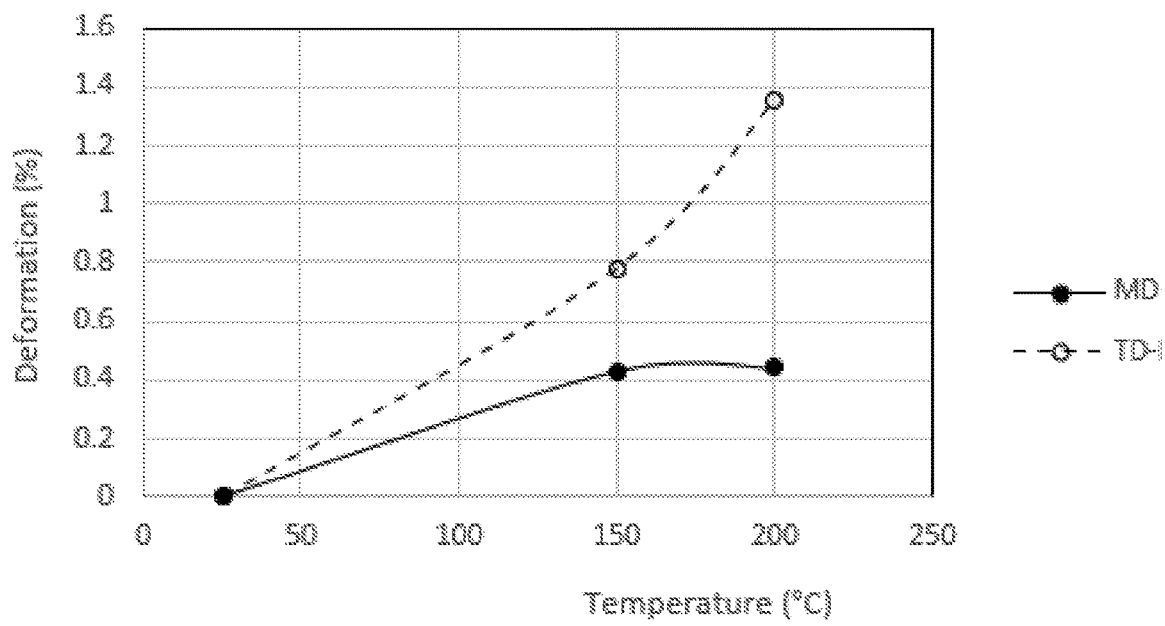

A series of biaxially oriented films was made in order to determine the effects of post-stretching heat-treatment on thermal expansion. Comparative Example 5, Example 7 and Example 16 were PET films each having a thickness of 6 µm. Comparative Example 6 was a PEN film having a thickness of 6 µm. The films were simultaneously stretched in the MD and TD using the stretch ratios shown in Table 2. The biaxially stretched films were then annealed under dimensional restraint and then subjected to MD and TD relaxation according to the conditions shown in Table 2. Comparative Example 5, Example 7 and Example 16 were subjected to two relaxation steps, whereas Comparative Example 6 was subjected to one relaxation step. The thermal expansion in air at 200° C. and the coefficient of linear thermal expansion in both the MD and TD was assessed for each film and the results are shown in Table 2 (in which "n/m" means "not measured"). A negative value for the thermal expansion indicates shrinkage. Plots of the thermal expansion between 32° C. and 200° C. of each of Examples 5 to 7 are shown in FIGS. 2A-2C respectively.

Example 7 (FIG. 2C) advantageously exhibits a positive CLTE over the range of 32° C. to 200° C. in each of the TD and MD, since the film exhibits TD and MD expansion across this temperature range, including at higher temperatures of 200° C.

Experiment 3

A series of current collectors was made by metallizing a series of biaxially oriented polyester films. The polymer and thickness of the biaxially oriented substrate are shown in Table 3. Prior to the deposition of the metal layer, the biaxially oriented films were simultaneously stretched in the MD and TD using the stretch ratios shown in Table 3 and were then relaxed in the MD and TD using the conditions shown in Table 3 (in which "-" means the films were not subjected to said relaxation step). The total duration of the relaxation step(s) was between 0.4 and 4.7 seconds. A metal layer of Al having a thickness of from 40 to 91 nm (as shown in Table 3) was then deposited on a first surface of the

TABLE 2

| Example | Stretching ratio MD | Stretching ratio TD | Anneal temp (° C.) | First relaxation step MD (%) | First relaxation step TD (%) | First relaxation step Temp (° C.) | Second relaxation step MD (%) | Second relaxation step TD (%) | Second relaxation step Temp (° C.) | Thermal expansion at 200° C. MD (%) | Thermal expansion at 200° C. TD (%) | Coefficient of linear thermal expansion (CLTE) over the range of 32° C. to 200° C. MD (/° C.) | Coefficient of linear thermal expansion (CLTE) over the range of 32° C. to 200° C. TD (/° C.) |
|---|---|---|---|---|---|---|---|---|---|---|---|---|---|
| Comp. Ex. 5 | 3.5 | 3.65 | 227 | 0 | −1 | 180 | 0 | −0.4 | 157 | −1.39 | −0.3 | −8.3 × 10⁻⁵ | −1.8 × 10⁻⁵ |
| Comp. Ex. 6 | 3.35 | 3.55 | 225 | 0 | −1 | 190 | — | — | — | −0.21 | 0.11 | −1.3 × 10⁻⁵ | 6.5 × 10⁻⁶ |
| Ex. 7 | 3.45 | 3.45 | 238 | −1.5 | −1.5 | 225 | −1.5 | −1.5 | 200 | 0.44 | 1.36 | 2.6 × 10⁻⁵ | 8.1 × 10⁻⁵ |
| Ex. 16 | 3.5 | 3.5 | 242 | −1.5 | −1.0 | 242 | −1.5 | −1.0 | 232 | >0 | >0 | n/m | n/m |

As shown in Table 2 and FIG. 2, the thermal expansion behaviour of the film is a function of the degree of relaxation and the temperature used during the relaxation step(s). For instance, the film of Comparative Example 5 (FIG. 2A) exhibits TD expansion below about 180° C., which corresponds to the highest temperature used during the TD relaxation step, and then exhibits TD shrinkage at higher temperatures. In contrast, the film of Example 7 (FIG. 2C) and the film of Example 16 exhibit TD expansion at 200° C., because a higher temperature was used during the TD relaxation step.

Furthermore, the film of Comparative Example 5 exhibits a negative CLTE over the range of 32° C. to 200° C. in each of the TD and MD, since the film exhibits TD and MD shrinkage at higher temperatures. In contrast, the film of biaxially oriented substrate. For each of Comparative Examples 8-9 and Examples 11-12, a second metal layer of Al having the same thickness as the first metal layer was then deposited on a second surface of the biaxially oriented substrate to provide current collectors having an ABC-layer structure, wherein layer A is the first metal layer, layer B is the polyester film substrate and layer C is the second metal layer. The thermal expansion in air at 200° C. of the film in the MD and the TD, and the delamination resistance of the current collector were measured as described herein and the results are shown in Table 3.

TABLE 3

| Example | Polymer | Substrate thickness (µm) | Stretching ratio MD | Stretching ratio TD | First relaxation step MD (%) | First relaxation step TD (%) | First relaxation step Temp (° C.) | Second relaxation step MD (%) | Second relaxation step TD (%) | Second relaxation step Temp (° C.) | Thermal expansion at 200° C. (%) MD | Thermal expansion at 200° C. (%) TD | Metallisation Thickness (nm) | Delamination resistance Time (min) @200° C. | Delamination resistance (%) |
|---|---|---|---|---|---|---|---|---|---|---|---|---|---|---|---|
| Comp. Ex. 8 | PEN | 4 | 3.35 | 3.55 | — | — | — | — | −1 | 190 | −0.87 | 0.11 | 73 | 5 | −68.9 |
| Comp. Ex. 9 | PET | 4 | 3.70 | 3.65 | — | — | — | — | −1 | 180 | −1.19 | −0.68 | 80 | 5 | −45.4 |
| Comp. Ex. 10a | PEN | 6 | 3.35 | 3.55 | — | — | — | — | −1 | 190 | −0.45 | 0.18 | 40-88 | 5 | −54.1 |
| Comp. Ex. 10b | PEN | 6 | 3.35 | 3.55 | — | — | — | — | −1 | 190 | −0.45 | 0.18 | 40-88 | 10 | −55.6 |
| Ex. 11 | PET | 9.2 | 3.5 | 3.5 | −1.7 | −1.7 | 215 | — | — | — | 0.45 | 2.53 | 91 | 10 | −6.4 |
| Ex. 12 | PET | 6 | 3.45 | 3.45 | −1.5 | −1.5 | 225 | −1.5 | −1.5 | 215 | 0.54 | 1.01 | 53 | 5 | −4.7 | of the TD and MD, since the film exhibits TD and MD shrinkage at higher temperatures. In contrast, the film of As demonstrated by the data in Table 3, current collectors wherein the substrate layer exhibits positive thermal expansion in each of the MD and TD provide surprisingly improved delamination resistance upon exposure to elevated temperatures. The films of each of Examples 11 and 12 exhibit positive MD and TD expansion at 200° C. and provide surprisingly improved delamination resistance.

In particular, the adhesion strength of the film is surprisingly retained after exposure to elevated temperatures as the decrease in adhesion strength is very small. Thus, overall, the degree of adhesion observed after exposure to elevated temperatures is still high. In contrast, the films of each of Comparative Examples 8 to 10 exhibit at least MD shrinkage at 200° C. and exhibit poor delamination resistance since at least 45% of the original adhesion strength is lost following exposure to elevated temperatures.

The sheet resistance of the film of Comp. Ex. 10 was measured as described herein. The sheet resistance was found to be between 0.9 and 2 $\Omega sq^{-1}$. Thus, the current collectors exhibited good sheet resistance. In particular, the current collectors having the higher metal layer thickness of about 88 nm advantageously achieved a sheet resistance of less than 1 $\Omega sq^{-1}$.

Reference Experiment 4

A preliminary series of current collectors was made using a PEN polyester substrate layer and first and second Cu metal layers. The biaxially oriented PEN polyester film had a thickness of 6 μm. The film was simultaneously stretched in the MD and TD, with a MD stretch ratio of 3.35 and a TD stretch ratio of 3.55. The biaxially oriented PEN polyester film was then annealed under dimensional restraint and subject to TD relaxation of −1% at a temperature of 190° C. for 2.8 seconds. The thermal expansion in air at 200° C. of the film in the MD and the TD were measured as described herein and were found to be −0.45 and 0.18 respectively.

First and second Cu metal layers were deposited on the biaxially oriented PEN polyester film using the virtual cathode deposition process described hereinabove to provide Comparative Examples 13 and 14. Comparative Example 15 was a conventional metal foil made from Cu. Table 4 shows the thicknesses, as well as the through-film resistance (R), Sheet Resistance (Sheet R), breakdown current and temperature at breakdown measured as described herein.

TABLE 4

| Example | Structure; Thickness | Total mass (mg/cm$^2$) | Density (g/cm$^3$) | Sheet R ($\Omega$/sq) | Breakdown Current (A) | Breakdown Temp. (° C.) |
|---|---|---|---|---|---|---|
| Comp. Ex. 13 | Cu/PEN/Cu; 150 nm/6 μm/150 nm | 1.11 (PEN = 0.83; Cu = 0.28) | 1.8 | 0.16 | 4 | 161 |
| Comp. Ex. 14 | Cu/PEN/Cu; 200 nm/6 μm/200 nm | 1.27 (PEN = 0.86; Cu = 0.41) | 2.1 | 0.11 | 4 | 206 |
| Comp. Ex. 15 | Cu; 12 μm | 9.08 | 9.0 | 0.001 | 35 | 841 |

The results in Table 4 demonstrate that current collectors based on metallised polymeric films exhibit advantageously lower breakdown current and breakdown temperature compared to conventional metal foil current collectors, and are therefore able to prevent excessive current flow during use, thereby minimising the risk of a short circuit or thermal propagation. The sheet resistance was sufficiently low to allow good conductivity in the plane of the copper layers.

The invention claimed is:

1. A current collector comprising a biaxially oriented polyester substrate layer, a first metal layer on a side of the polyester substrate layer, and a second metal layer, wherein the first metal layer and the second metal layer are on opposing sides of the polyester substrate layer, wherein the polyester substrate layer exhibits positive thermal expansion in air at 200° C. in each of the transverse direction (TD) and machine direction (MD), wherein the polyester substrate layer has a thickness of no more than 12 μm, wherein the first metal layer has a thickness of no more than 1000 nm, and wherein the second metal layer independently has a thickness of no more than 1000 nm.

2. The current collector according to claim 1, wherein the thickness of the polyester substrate layer is from 1.0 μm to 12.0 μm, preferably from 2.0 to 8.0 μm, preferably from 4.0 to 8.0 μm, preferably from 4.0 to 6.0 μm.

3. The current collector according to claim 1, wherein the polyester is polyethylene terephthalate or polyethylene naphthalate.

4. The current collector according to claim 1, wherein the polyester substrate layer exhibits thermal expansion in air at 200° C. of from greater than 0% to no more than 3.0%, preferably from 0.1% to 2.0%, preferably from 0.2% to 1.5%, in each of the transverse direction (TD) and in the machine direction (MD).

5. The current collector according to claim 1, wherein the polyester substrate layer exhibits a positive coefficient of linear thermal expansion (CLTE) over the range of 32° C. to 200° C., preferably of less than $20\times10^{-5}$/° C., preferably of less than $17\times10^{-5}$/° C., preferably of less than $10\times10^{-5}$/° C., preferably of less than $9\times10^{-5}$/° C., preferably of less than $8.5\times10^{-5}$/° C. in each of the transverse direction (TD) and machine direction (MD).

6. The current collector according to claim 1, wherein the thickness of the first metal layer and the second metal layer is each independently from 50 nm to 1000 nm, preferably from 100 nm to 1000 nm, preferably from 100 nm to 800 nm, preferably from 150 nm to 700 nm.

7. The current collector according to claim 1, wherein the first metal layer and the second metal layer each independently exhibits isotropic thermal expansion in air at 200° C. of from greater than 0% to no more than 1.0%, wherein isotropic thermal expansion means that the layers expand by the same amount in orthogonal directions, preferably from 0.25% to 0.75%, preferably from 0.3% to 0.5%, preferably wherein the first metal layer and the second metal layer exhibit the same thermal expansion at 200° C. as each other.

8. The current collector according to claim 1, wherein the first metal layer and the second metal layer each independently exhibit a positive coefficient of linear thermal expansion (CLTE) in air at 100° C. of from $10\times10^{-6}$/° C. to $30\times10^{-6}$/° C., preferably from $12\times10^{-6}$/° C. to $18\times10^{-6}$/° C.

9. The current collector according to claim 1, wherein the first metal layer and the second metal layer each independently comprise at least one of aluminium, copper, nickel, titanium, silver, nickel-copper alloy, or aluminium-zirconium alloy, and preferably wherein the first and second metal layers are selected from the same material.

10. The current collector according to claim 1, wherein the first and second metal layers are both either aluminium or copper.

11. The current collector according to claim 1, wherein the adhesion strength between a metal layer and the polyester substrate layer is least 600 g/25 mm, preferably at least about 700 g/25 mm, preferably at least about 800 g/25 mm.

12. The current collector according to claim 1 which exhibits a sheet resistance of from 0.01 $\Omega sq^{-1}$ to 2.0 $\Omega sq^{-1}$, preferably from 0.02 $\Omega sq^{-1}$ to 2.0 $\Omega sq^{-1}$, preferably from 0.02 $\Omega sq^{-1}$ to 1.5 $\Omega sq^{-1}$, preferably from 0.05 $\Omega sq^{-1}$ to 1.0 $\Omega sq^{-1}$.

13. The current collector according to claim 1, wherein the current collector exhibits a breakdown current of no more than about 30 A and/or a breakdown temperature of no more than about 300° C.

14. The current collector according to claim 1, which further comprises at least one tab which connects the first metal layer and the second metal layer.

15. The current collector according to claim 1 wherein the polyester substrate layer comprises channels which extend from the first surface to the second, opposite surface thereof wherein (i) the sides of the channels are at least partially coated with at least one metal, and/or (ii) the channels are at least partially filled with at least one metal.

16. A method of manufacturing the current collector of claim 1, wherein the method comprises the steps of:
   (i) forming the biaxially oriented polyester substrate layer; and
   (ii) depositing a metal on a first surface of said substrate layer to form the first metal layer; and
   (iii) depositing on a second surface of said substrate layer a metal to form the second metal layer;
   such that the layer order is first metal layer/polymeric substrate layer/second metal layer.

17. The method according to claim 16, wherein step (i) comprises extruding a layer of molten polyester, subjecting the extrudate to biaxial stretching at a temperature above the glass transition temperature(s) of the polyester, preferably wherein said biaxial stretching is simultaneous biaxial stretching, and preferably stretching is effected so that the dimension of the oriented film is 2 to 5 times its original dimension in each direction of stretching.

18. The method according to claim 16, wherein step (i) comprises dimensionally stabilising a biaxially stretched film by annealing under dimensional support at a temperature above the glass transition temperature(s) of the polyester but below the melting temperature ($T_M$) thereof, preferably wherein the annealing temperature is in the range of from about $T_M$–80° C. to about $T_M$–10° C., and preferably in the range of from about 200 to about 245° C., preferably in the range of from about 220 to about 240° C.

19. The method according to claim 16, wherein step (i) comprises subjecting a biaxially stretched film to dimensional relaxation in both the transverse direction and machine direction, and wherein the degree of relaxation is from about 0.5% to about 5.0%.

20. The method according to claim 19, wherein step (i) comprises a second relaxation step after the relaxation step wherein the second relaxation step is conducted at a lower temperature than the relaxation step, preferably at least about 5° C. lower, and preferably in the range of from about 195° C. to about 240° C., preferably from about 195° C. to about 235° C., preferably from about 195° C. to about 230° C., preferably from about 195° C. to about 220° C.

21. The method according to claim 16, comprising subjecting an exposed surface of the polyester substrate layer to a surface-modifying treatment, wherein said treatment step occurs after step (i) and prior to step (ii), preferably wherein said treatment comprises subjecting the exposed surface of the polyester substrate layer to a plasma treatment, preferably corona discharge.

22. The method according to claim 16, wherein step (ii) and/or step (iii) comprises depositing the metal using thermal evaporation deposition, electron beam evaporation deposition or virtual cathode deposition.

23. The use of a biaxially oriented polyester film as a substrate in a current collector which further comprises a first metal layer and a second metal layer, wherein said use is for imparting improved adhesion strength and delamination resistance between said substrate and metal layers, and wherein the polyester substrate layer exhibits positive thermal expansion in air at 200° C. in each of the transverse direction (TD) and the machine direction (MD), wherein the polyester substrate layer has a thickness of no more than 12 μm, wherein the first metal layer has a thickness of no more than 1000 nm, and wherein the second metal layer independently has a thickness of no more than 1000 nm.

24. A battery comprising an anode material, a cathode material, a separator between the anode material and the cathode material, an anode current collector and a cathode current collector, wherein at least one of the current collectors is a current collector as defined in claim 1.

25. The battery according to claim 24, wherein the battery is a lithium-ion battery.

26. The battery according to claim 24, wherein the anode material is coated onto the anode current collector and wherein the anode current collector is a current collector comprising a biaxially oriented polyester substrate layer, a first metal layer on a side of the polyester substrate layer, and a second metal layer, wherein the first metal layer and the second metal layer are on opposing sides of the polyester substrate layer, wherein the polyester substrate layer exhibits positive thermal expansion in air at 200° C. in each of the transverse direction (TD) and machine direction (MD), wherein the polyester substrate layer has a thickness of no more than 12 μm, wherein the first metal layer has a thickness of no more than 1000 nm, and wherein the second metal layer independently has a thickness of no more than 1000 nm.

27. The battery according to claim 24, wherein the cathode material is coated onto the cathode current collector and wherein the cathode current collector is a current collector comprising a biaxially oriented polyester substrate layer, a first metal layer on a side of the polyester substrate layer, and a second metal layer, wherein the first metal layer and the second metal layer are on opposing sides of the polyester substrate layer, wherein the polyester substrate layer exhibits positive thermal expansion in air at 200° C. in each of the transverse direction (TD) and machine direction (MD), wherein the polyester substrate layer has a thickness of no more than 12 μm, wherein the first metal layer has a thickness of no more than 1000 nm, and wherein the second metal layer independently has a thickness of no more than 1000 nm.

28. Use of a current collector comprising a biaxially oriented polyester substrate layer, a first metal layer on a side of the polyester substrate layer, and a second metal layer, wherein the first metal layer and the second metal layer are on opposing sides of the polyester substrate layer, wherein the polyester substrate layer exhibits positive thermal expansion in air at 200° C. in each of the transverse direction (TD) and machine direction (MD), wherein the polyester substrate layer has a thickness of no more than 12 µm, wherein the first metal layer has a thickness of no more than 1000 nm, and wherein the second metal layer independently has a thickness of no more than 1000 nm in the battery as defined in claim 24.

29. A method of manufacturing a battery, the method comprising the steps of
  (i) preparing or obtaining the current collector of claim 1;
  (ii) assembling the battery, wherein the battery comprises an anode material, a cathode material, a separator between the anode material and the cathode material, an anode current collector and a cathode current collector, wherein at least one of said current collectors is the current collector obtained from step (i).

\* \* \* \* \*